US006240352B1

(12) United States Patent
McCurdy

(10) Patent No.: US 6,240,352 B1
(45) Date of Patent: May 29, 2001

(54) VEHICLE ARRANGEMENT WITH COOPERATING POWER SEAT AND VEHICLE OCCUPANT PROTECTION SYSTEMS

(75) Inventor: Roger A. McCurdy, Troy, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/378,342

(22) Filed: Aug. 20, 1999

(51) Int. Cl.⁷ .............................. B60R 21/16; B60N 2/04
(52) U.S. Cl. ................. 701/45; 701/49; 280/735
(58) Field of Search ...................... 701/45, 49; 280/734, 280/735, 731, 732; 296/68.1, 65.15

(56) References Cited

U.S. PATENT DOCUMENTS

| | | |
|---|---|---|
| 4,797,824 | 1/1989 | Sugiyama et al. . |
| 5,232,243 | 8/1993 | Blackburn et al. . |
| 5,398,185 | 3/1995 | Omura . |
| 5,670,853 | 9/1997 | Bauer . |
| 5,748,473 | 5/1998 | Breed et al. . |
| 5,765,915 | 6/1998 | Lee . |
| 5,803,491 | 9/1998 | Barnes et al. . |
| 5,822,707 | 10/1998 | Breed et al. . |
| 5,829,782 | 11/1998 | Breed et al. . |
| 5,967,549 | * 10/1999 | Allen et al. ......................... 280/735 |
| 6,123,357 | * 9/2000 | Hosoda et al. .................... 280/730.2 |

* cited by examiner

Primary Examiner—Michael J. Zanelli
(74) Attorney, Agent, or Firm—Tarolli, Sundheim, Covell, Tummino & Szabo L.L.P.

(57) ABSTRACT

A vehicle arrangement (10) includes a power seat system (14) and an occupant protection system (40). The power seat system (14) includes a seat (18) provided for an occupant (16) and movable relative to a vehicle chassis (20). A motor (24) moves the seat (18) and a sensor (28) senses location of the seat. A seat controller (26) controls the motor (24), and contains a memory (34) for retaining an occupant predefined seat location. A recall switch (e.g., 30) causes movement to the predefined seat location. The protection system (14) includes an actuatable protection device (42), wherein location of the occupant (16) relative to the device is related to seat location. An override portion (72) of a protection system controller (52) automatically positions the seat (18) out of a range of seat locations that places the occupant (16) out of an optimum protection zone. Actuation of a manual override switch (60) permits movement of the seat (18) into the range of seat locations that places the occupant (16) out of the optimum protection zone. Preferably, actuation of the protection device (42) is based upon seat location provided by the seat system (14).

4 Claims, 4 Drawing Sheets

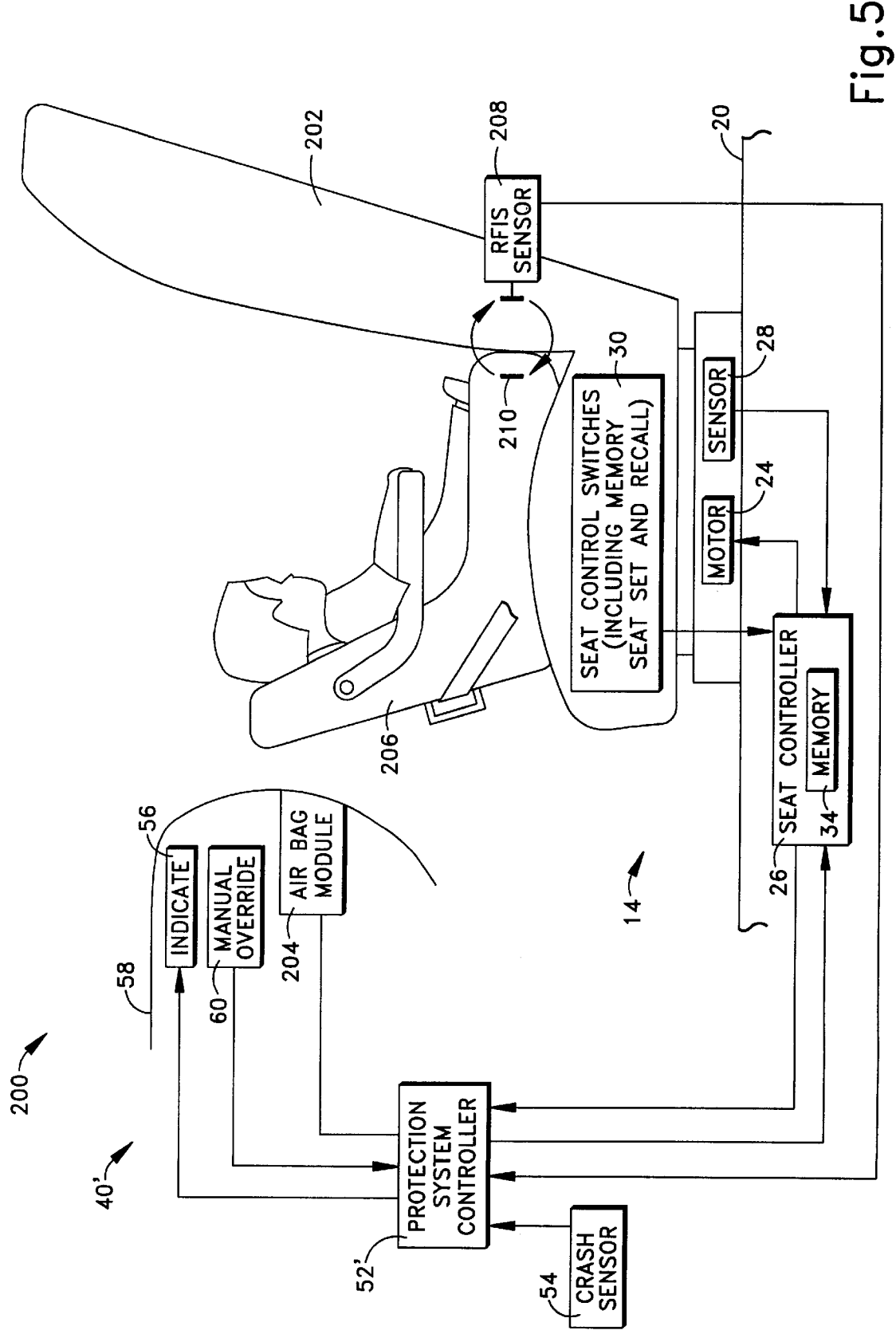

VEHICLE ARRANGEMENT WITH COOPERATING POWER SEAT AND VEHICLE OCCUPANT PROTECTION SYSTEMS

TECHNICAL FIELD

The present invention relates to power seat control and protection of a vehicle occupant.

BACKGROUND OF THE INVENTION

Occupant protection systems for use in vehicles are known in the art. One type of protection system includes an actuatable inflatable restraint module, which has an inflatable restraint that is commonly referred to as an air bag. A controller determines whether the air bag module is to be actuated to inflate the air bag within a vehicle occupant compartment. The air bag module is actuated by the controller upon the occurrence of a predetermined condition for which a vehicle occupant is to be cushioned. For example, a sensor senses a vehicle condition indicative of a vehicle crash condition and, in response thereto, the air bag module is actuated.

In certain circumstances, even if the predetermined crash condition occurs, it may be preferable to refrain from actuating the air bag module (i.e., prevent inflation of the air bag). Specifically, if the occupant associated with the air bag module is at a location such that actuating the air bag module and deploying the air bag will not enhance protection of the occupant, actuation of the air bag module does not occur. One example in which an occupant is located such that actuating the air bag module and deploying the air bag will not enhance protection of the occupant is when the occupant is very near the air bag module. An occupant who is very near the air bag module is referred to as being within an occupant out-of-position zone. Actuation of the air bag module for an occupant who is within the occupant out-of-position zone will not enhance protection of the occupant.

A protection system that provides for control of a protection system device (e.g., an air bag module) in response to a sensed occupant condition (e.g., occupant type and occupant location) is commonly referred to as a "smart" protection system. Smart protection systems control actuation of the associated protection system device (e.g., the air bag module), and may also control a deployment profile (e.g., timing and manner of deployment) of the device. For example, smart control of an air bag module can include control of the amount of inflation fluid used to inflate the air bag in response to sensed occupant location.

Many modern vehicles are equipped with movable power seats. Within a power seat system, a power seat motor is controlled to move an associated seat, and an occupant located thereupon. Control of the motor is responsive to manual actuation of switches that are typically located somewhere on the seat. The movement of the seat is relative to a vehicle chassis, other vehicle interior components, etc.

A feature that is often associated with power seats is a memory seat function, in which an occupant-desired seat location is readily re-established. A memory is utilized to store the desired seat location. Actuation of the memory seat function is typically via a memory switch located within the vehicle, on a key chain fob, or the like. Upon actuation of the memory seat function, a controller utilizes a sensed input from a seat location sensor to determine direction and distance to move the seat to the memory-stored seat location, and the motor is operated accordingly. A plurality of occupant-desired seat locations can be stored in the memory. Thus, several vehicle users can take advantage of the memory seat function, with each user having their own seat location preference.

Thus, the use of a power seat, and specifically the use of a memory seat function, within a vehicle permits ease of movement of the seat. Thus, the location of the occupant relative to the interior of the vehicle is readily changeable. As noted above, location of the occupant relative to an associated protection device may result in an alteration of deployment of the associated protection device.

SUMMARY OF THE INVENTION

The present invention provides an arrangement for a vehicle. The arrangement includes a power seat system. A seat is provided for a vehicle occupant and is movable relative to a chassis of the vehicle. A sensor senses location of the seat. A motor moves the seat. A seat controller controls the motor. The power seat system includes memory storage means for retaining an occupant predefined seat location. The power seat system also includes memory actuation means for causing the seat controller to control the motor to move the seat to the occupant predefined seat location.

The arrangement also includes a vehicle occupant protection system that includes an actuatable occupant protection device. Location of the occupant relative to the occupant protection device is related to seat location. The protection system includes automatic override means for locating the seat out of a range of seat locations that place the occupant out of an optimum protection zone with regard to the occupant protection device. The protection system includes manual override means manually operable for permitting a movement of the seat into the range of seat locations that place the occupant out of the optimum protection zone.

BRIEF DESCRIPTION OF THE DRAWINGS

The foregoing and other features and advantages of the present invention will become apparent to those skilled in the art to which the present invention relates upon reading the following description with reference to the accompanying drawings, wherein:

FIG. 5 is a schematic illustration of an embodiment similar to the embodiment shown in FIG. 1, but includes a vehicle passenger seat.

DESCRIPTION OF PREFERRED EMBODIMENTS

Figure 1:
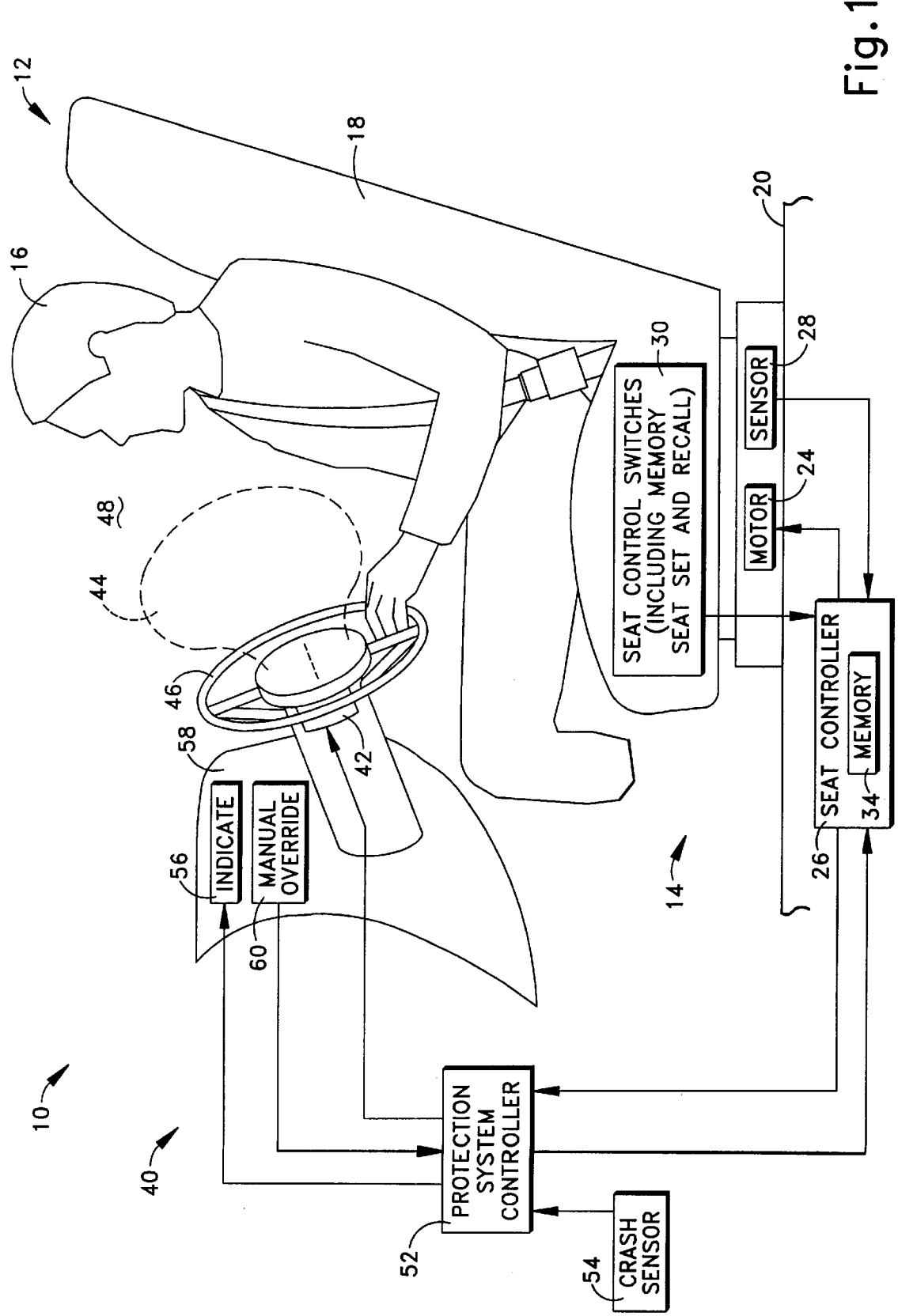
FIG. 1 is a schematic illustration of an arrangement in accordance with the present invention within an associated vehicle and provided for a vehicle driver.

An arrangement 10 in accordance with the present invention is schematically illustrated in FIG. 1 along with an associated vehicle 12. The arrangement 10 includes a power seat system 14. In the embodiment shown in FIG. 1, the arrangement 10 is provided for a vehicle driver 16, and the power seat system 14 includes a vehicle driver seat 18. The seat 18 is movable relative to a chassis 20 and other components of the vehicle 12 along a fore-to-aft direction of the vehicle. A motor 24 of the power seat system 14 is operable by a seat controller 26 to move the seat 18. A sensor 28 senses the location of the seat 18 relative to the chassis 20 and provides location information to the seat controller 26.

Manual control of the location of the seat 18 relative to the chassis 20 is accomplished via one or more seat control switches 30. In the illustrated example, the switches 30 are located on the seat 18. However, it is to be appreciated that the switches 30 may be located at another convenient location.

The power seat system 14 includes a memory seat function that permits setting, and easy return to, a certain seat location by the vehicle occupant (e.g., the driver) 16. In order to accomplish the memory seat function, the seat controller 26 includes a memory 34 for storing occupant-set seat location information, and the seat control switches 30 include switches for setting and recalling the occupant-set seat location. It is to be appreciated that the set and recall control switches may be located on the seat 18, another portion of the vehicle 12, or on a hand-held fob.

A vehicle occupant protection system 40 of the arrangement 10 is also shown in FIG. 1. The occupant protection system 40 includes an actuatable occupant restraint module 42, which includes an inflatable restraint 44. The inflatable restraint 44 is commonly referred to as an air bag. The restraint module 42 is a device that is mounted on a hub of a vehicle steering wheel 46, and the air bag 44 is inflatable within an occupant compartment 48 of the vehicle 12, as will be understood by a person of ordinary skill in the art. The restraint module 42 has a location relative to the vehicle chassis 20 that is know or readily calculated. Hereinafter, the restraint module 42 is referred to as the air bag module 42.

Control of the air bag module 42 is by a protection system controller 52, which provides control signals to the air bag module 42. In one example, the protection system controller 52 includes a microcomputer. The protection system controller 52 receives sensory input from several sources and, using the sensory input, makes determinations regarding air bag module control. One of the sensory input sources for the protection system controller 52 is a sensor 54 that senses a vehicle condition for which the occupant 16 is to be protected via deployment of the air bag module 42. The sensor 54 provides a signal to the protection system controller 52 indicative of the sensed vehicle condition. In the illustrated example, the sensor 54 is a crash sensor and senses a condition that is indicative of a vehicle crash. Preferably, the crash sensor 54 is an accelerometer, and the signal is an electrical signal that has a characteristic (e.g., voltage, frequency) indicative of the sensed acceleration.

Another sensory input for the protection system controller 52 is a seat location indication provided by the seat controller 26 of the power seat system 14. The location of the seat 18 is indicative of the location of the occupant 16 relative to the air bag module. Location of the occupant 16 relative to the air bag module 42 is useful to determine whether the occupant 16 is located within an optimum protection zone. The optimum protection zone is a zone of occupant locations for which deployment of the air bag module 42 will provide optimum protection for the occupant 16. If the occupant 16 is located out of the occupant protection zone (e.g., located relatively near to the air bag module 42), deployment of the air bag module will not result in optimum protection of the occupant 16.

The seat controller 26 provides the seat location information to the protection system controller 52 based upon sensory information derived from the seat location sensor 28 of the power seat system 14. The protection system controller 52 utilizes the seat location information to determine whether to actuate the air bag module 42. Also, the protection system controller 52 utilizes the seat location information to determine a deployment profile (i.e., inflation timing, pressure, etc.) that occurs upon a determination to actuate the air bag module 42.

The protection system controller 52 interacts with the seat controller 26 to provide an indication via an indication light 56 to the occupant 16 that the seat location chosen by the occupant 16 will place (or has placed) the occupant out of the optimum protection zone. The indication light 56 is at a suitable location. In the example shown in FIG. 1, the indication light 56 is on an instrument panel 58.

The protection system controller 52 also cooperates with the seat controller 26 to prevent movement of the seat 18 that would place the occupant 16 out of the optimum protection zone and/or to relocate the seat such that the occupant remains in the optimum protection zone. Movement of the seat 18 that places the occupant out of the optimum protection zone is only permitted when the occupant 16 activates a manual override. In one example, the manual override is accomplished via operation of an override switch 60. The manual override switch 60 is at a suitable location, such as on the instrument panel 58. In another example (not shown), the manual override function may be accomplished via a repeat activation of the memory recall switch after the indication light 56 indicates that the occupant 16 is intending to position the seat 18 at a location that would place the occupant out of the optimum protection zone.

The manual override switch 60 provides a signal to the protection system controller 52. In turn, the protection system controller 52 provides an appropriate signal to the seat controller 26 to permit the movement of the seat 18 and associated repositioning of the occupant 16 out of the optimum protection zone.

Figure 2:
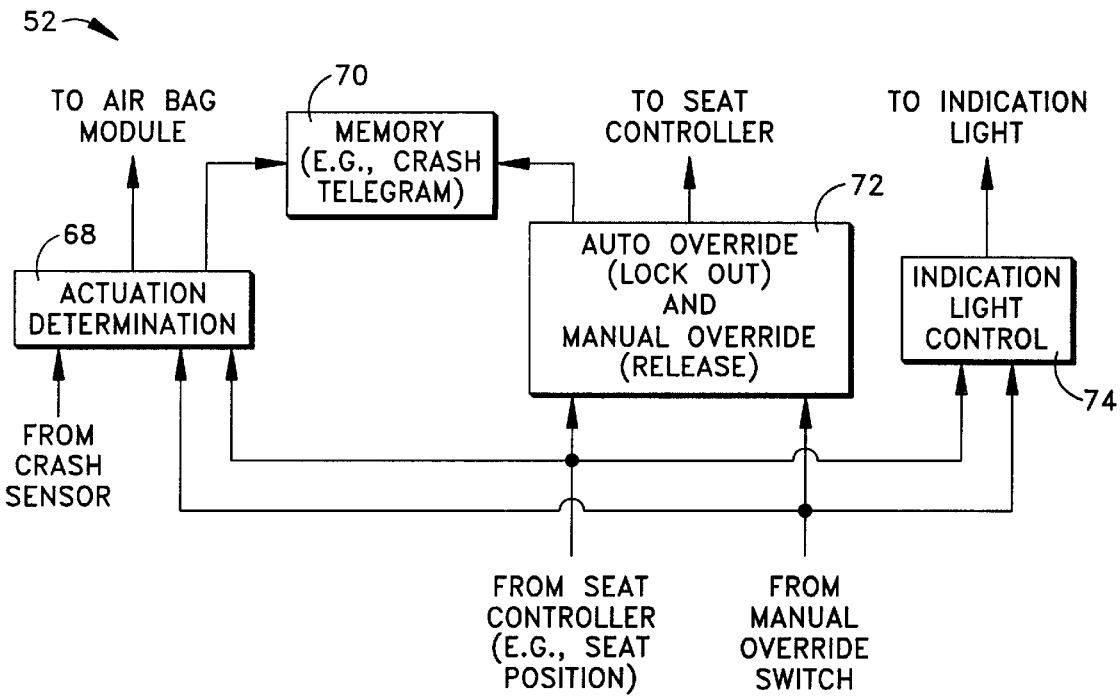
FIG. 2 is a function block diagram of a protection system controller within an occupant protection system of the arrangement shown in FIG. 1.

Turning to FIG. 2, details of the functions performed by the protection system controller 52 are shown in a function block arrangement. Within the protection system controller 52, an actuation determination portion 68 receives sensory input from the crash sensor 54, the seat controller 26, and the manual override switch 60. Based upon the sensory input, the actuation determination portion 68 makes one or more determinations regarding whether to actuate the air bag module 42 and one or more determinations regarding the deployment profile of the air bag 44 upon actuation. Appropriate signals are provided from the actuation determination portion 68 to the air bag module 42.

The actuation determination portion 68 also provides information to a memory 70 within the protection system controller 52. The memory 70 stores information such as sensory information that was utilized by the actuation determination portion 68 to determine actuation control of the air bag module 42. The memory 70 is a non-volatile memory. The information stored within the memory 70 can be retrieved at some point in time after a deployment of the air bag module 42. For example, the use of such a memory can provide what is commonly referred to as a crash telegram that permits investigators to determine the status of various vehicle components at the time of a crash.

The protection system controller 52 includes an override portion 72 that controls the auto override and manual override functions. Input to the override portion 72 is provided by the seat controller 26 (e.g., provides seat location) and from the manual override switch 60. Output from the override portion 72 is provided to the seat controller 26.

As its first aspect, the override portion 72 determines whether the seat 18 is either at, or has been requested to move into, a location that places the occupant 16 out of the optimum protection zone. If it is determined that the location of the seat 18 places the occupant 16 out of the optimum protection zone, the override portion 72 causes movement of the seat to position the occupant into the optimum protection zone. If the requested movement of the seat 18 would place the occupant 16 out of the optimum protection zone, the override portion 72 initially prevents movement of the seat. In other words, actuating the memory recall switch to move the seat 18 into a location that would place the occupant out of the optimum protection zone does not result in an immediate movement of the seat to such a location. Thus, the override portion 72 performs a lockout function that maintains seat location such that the occupant is located within the optimum protection zone.

It is only when the occupant 16, after being warned via the indication light 56, actuates the manual override switch 60, does the override portion 72 permit the location of the seat 18 such that the occupant is out of the optimum protection zone. Thus, actuation of the manual override switch 60 acts as a release of the lockout aspect. However, the override portion 72 communicates with the memory 70. The override portion 72 provides such information to the memory 70 as the occurrence of actuation of the manual override switch 60 (i.e., as a request by the occupant to permit movement of the seat that places the occupant out of the optimum protection zone).

The protection system controller 52 includes an indication light control portion 74. Input to the indication light control portion 74 is provided by the seat controller 26 (e.g., provides seat location) and from the manual override switch 60. Output from the indication light control portion 74 is provided to the indication light 56.

Figure 3:
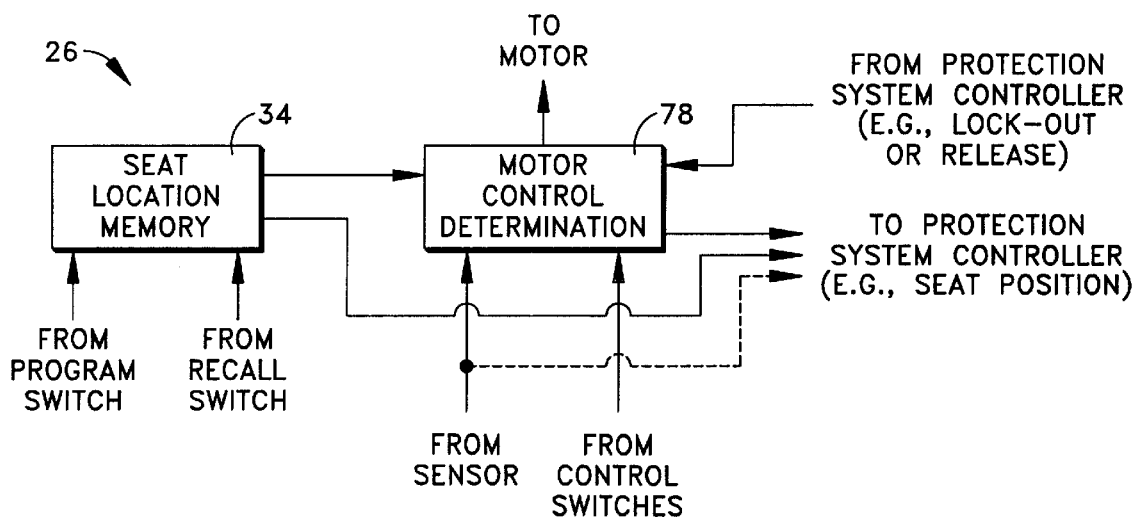
FIG. 3 is a function block diagram of a seat controller of a power seat system of the arrangement of FIG. 1.

Turning to FIG. 3, the seat controller 26 of the power seat system 14 is illustrated via a function block diagram. At the heart of the seat controller 26 is a motor control determination portion 78, which controls the drive of the motor 24 along the fore-to-aft direction. The motor control determination portion 78 receives inputs from the seat location sensor 28 and the seat control switches 30. During operation of the power seat system 14, so long as the requested movement of the seat 18 does not place the occupant 16 out of the optimum protection zone, the motor control determination portion 78 utilizes the inputs from the seat location sensor 28 and the seat control switches 30 to move the seat.

The seat location memory 34 is connected to receive the inputs from the set and recall switches. It should be noted that the input from the recall switch could be a processed signal derived from a RF receiver if the recall switch is located on a hand-held fob. In response to the requisite input from the recall switch, the seat location memory 34 provides the appropriate signal to the motor control determination portion 78. Similar to the scenario of direct control by the seat control switches 30, the motor control determination portion 78 provides appropriate control signals to the motor 24 so long as the movement of the seat 18 does not take the occupant 16 out of the optimum protection zone.

At least one of the portions of the seat controller 26 is connected to the protection system controller 52 to provide seat location information to the protection system controller. In the illustrated example, the motor control determination portion 78 and the seat location memory 34 are connected to provide the seat location information. The possibility of a connection taken directly from the sensor 28 is shown via the dash line in FIG. 3.

The motor control determination portion 78 is also connected to receive signals from the protection system controller 52. The received signals convey the lockout and the release commands. In other words, the operation of the motor control determination portion 78 to provide a control signal to the motor 24 is based upon the input provided by the protection system controller 52 for those situations in which seat movement would place the occupant 16 out of the optimum protection zone.

Figure 4:
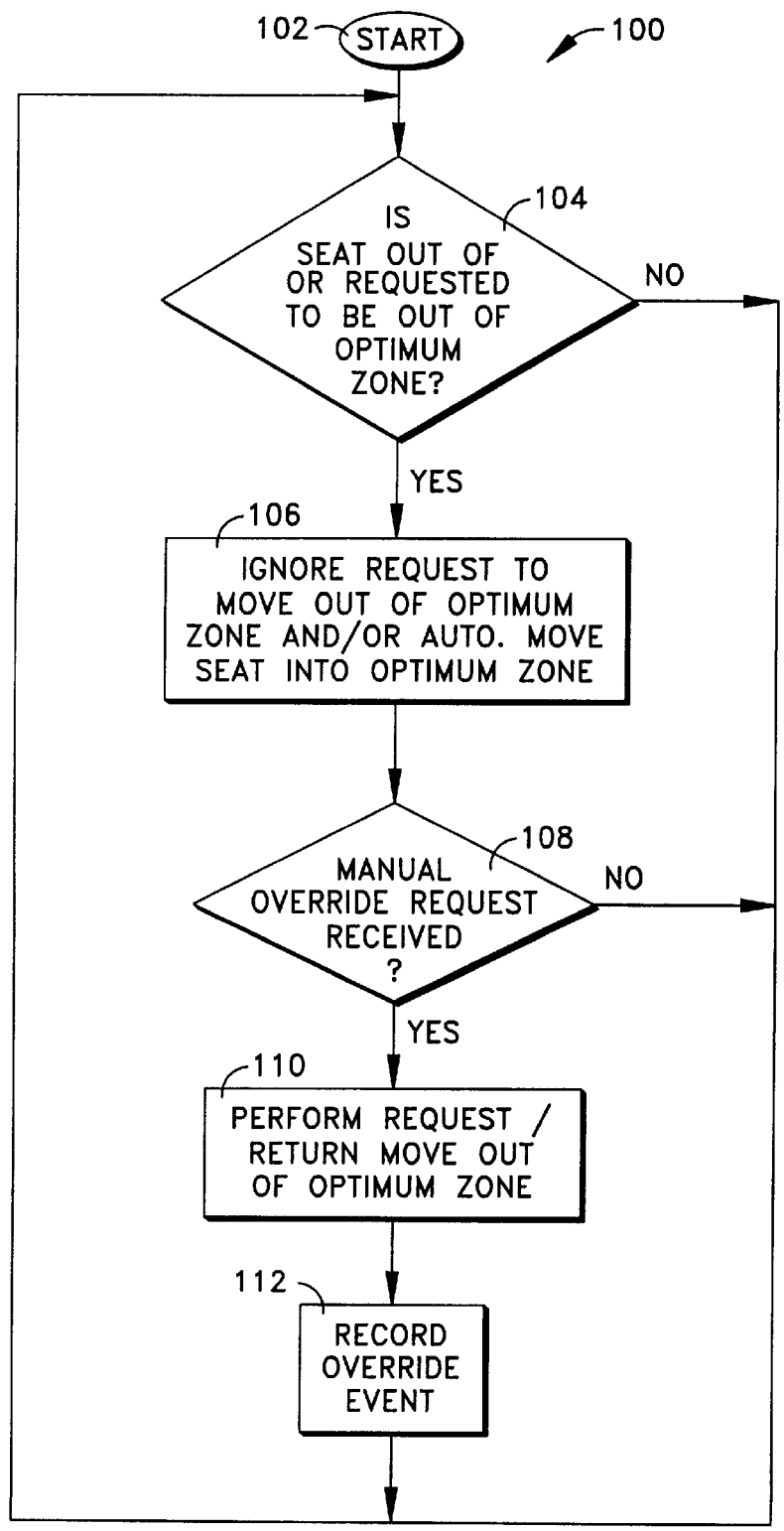
FIG. 4 is a flow chart for a process performed within the arrangement shown in FIG. 1.

A process 100 in accordance with the present invention and performed within the arrangement of FIG. 1 is set forth by the flowchart of FIG. 4. The process 100 begins at step 102 and proceeds to step 104. At step 104, it is determined whether the seat 18 is located or is requested to be located such that the occupant 16 is out of the optimum protection zone. If the determination at step 104 is negative, the process 100 loops back to repeat the query of step 104.

If the determination at step 104 is affirmative (i.e., location or movement such that occupant 16 is out of the optimum protection zone), the process 100 proceeds to step 106. At step 106, the seat controller 26 ignores the request to move out of the optimum protection zone and/or the seat 18 is automatically moved to place the occupant 16 into the optimum protection zone. At step 108, it is queried whether a manual override request from the manual override switch has been received. If the determination at step 108 is negative (i.e., the occupant 16 has not actuated the manual override switch 60), the process 100 loops back to step 104.

If the determination at step 108 is affirmative (i.e., the manual override switch 60 is activated by the occupant 16), the process 100 proceeds to step 110. At step 110, the requested movement or the return movement that places the occupant 16 out of the optimum protection zone is performed. At step 112, the actuation of the manual override switch is recorded into the memory 70 of the protection system controller 52. Upon the completion of step 112, the process 100 loops back to step 104.

An embodiment of an arrangement 200 (FIG. 5) in accordance with the present invention is associated with a passenger seat 202. Many components of the arrangement 200 of the second embodiment are identical to the corresponding components for the embodiment of FIG. 1. Identical reference numbers are used to identify identical components. Some of the components of the arrangement 200 are similar, but yet somehow different than the components that are present within the embodiment of FIG. 1. These components are identified via use of reference numbers that are accompanied by a "'" (a prime). The arrangement 200 of the second embodiment (FIG. 5) contains additional/different structure, and the additional/different structure is individually numbered accordingly.

The occupant protection system 40' of the arrangement 200 includes a passenger side air bag module 204. In the illustrated example, the air bag module 204 is located on the instrument panel 58 of the vehicle 12. The indication light 56 and the manual override switch 60 are also located on the instrument panel 58. Preferably, the indication light 56 and the manual override switch 60 are located in some close proximity to the air bag module 204.

The seat controller 26 controls the motor 24 to move the seat 202 along the fore-to-aft direction. Seat control switches 30 and the seat location sensor 28 provide input to the seat controller 26.

The protection system controller 52' controls actuation of the air bag module 204 based upon inputs from the crash sensor 54, the seat controller 26, and the manual override switch 60. The protection system controller 52' can lockout movement of the seat 202 such that an occupant could not be located outside of an optimum protection zone, unless the manual override switch 60 is actuated.

A potential exists that a rearward facing infant seat (RFIS) 206 could be located on the passenger seat 202. Thus, the occupant protection system 40' includes a rearward facing infant seat sensor 208. In the illustrated example, an identification tag 210 is located on the RFIS 206 and is associated with the RFIS sensor 208. The tag 210 is energized by the RFIS sensor 208 to provide a response signal to the RFIS sensor.

A signal indicative of the presence of the RFIS 206 is provided by the RFIS sensor 208 to the protection system controller 52'. In turn, the protection system controller 52' provides a signal to the seat controller 26 that indicates that the RFIS 206 is present and that causes the seat controller to automatically move the seat 202 to a rearmost location.

From the above description of the invention, those skilled in the art will perceive improvements, changes and modifications. Such improvements, changes and modifications within the skill of the art are intended to be covered by the appended claims.

Having described the invention, the following is claimed:

1. An arrangement for a vehicle, said arrangement comprising:

a power seat system comprising:

a vehicle seat provided for a vehicle occupant and movable relative to a chassis of the vehicle;

a sensor for sensing location of said seat;

a motor for moving said seat;

a seat controller for controlling said motor;

memory storage means for retaining an occupant predefined seat location; and memory actuation means for causing said seat controller to control said motor to move said seat to the occupant predefined seat location; and a vehicle occupant protection system comprising:

an actuatable occupant protection device, wherein location of the occupant relative to said occupant protection device being related to seat location;

automatic override means for positioning said seat out of a range of seat locations that places the occupant out of an optimum protection zone with regard to said occupant protection device; and manual override means manually operable for permitting movement of said seat into the range of seat locations that places the occupant out of the optimum protection zone.

2. An arrangement as set forth in claim 1, wherein said occupant protection system includes actuation control means for controlling actuation of said protection device, said actuation control means includes means for utilizing the sensed seat location from the power seat system and predefined seat location derived from said memory storage means to determine control of said protection device.

3. An arrangement as set forth in claim 1, wherein said occupant protection system includes memory means for retaining information regarding the occurrence of operation of said manual override means.

4. An arrangement as set forth in claim 1, wherein said occupant protection system includes means for detecting a child seat located upon said vehicle seat, and means for causing said seat controller to control said motor to move said seat to a location furthest from said occupant protection device.

* * * * *